(12) United States Patent
Sun et al.

(10) Patent No.: US 11,772,904 B2
(45) Date of Patent: Oct. 3, 2023

(54) INTELLIGENT DEVICE FOR CONVEYING, GRADING AND ALIGNING OF TUBE PRODUCTS

(71) Applicant: Nanjing Light Industrial Machinery Packaging Co, LTD., Jiangsu (CN)

(72) Inventors: Qi Sun, Jiangsu (CN); Zherui Wang, Jiangsu (CN); Yazhou Wang, Jiangsu (CN); Jianfeng Gu, Jiangsu (CN); Limin Hao, Jiangsu (CN)

(73) Assignee: Nanjing Light Industrial Machinery Packaging Co, LTD., Jiangsu (CN)

( * ) Notice: Subject to any disclaimer, the term of this patent is extended or adjusted under 35 U.S.C. 154(b) by 0 days.

(21) Appl. No.: 17/890,597

(22) Filed: Aug. 18, 2022

(65) Prior Publication Data
US 2022/0388784 A1 Dec. 8, 2022

(30) Foreign Application Priority Data
Jul. 4, 2022 (CN) .......................... 202210788220.X

(51) Int. Cl.
*B65G 47/24* (2006.01)
*B65G 21/20* (2006.01)
*B65G 15/42* (2006.01)

(52) U.S. Cl.
CPC ............. *B65G 47/24* (2013.01); *B65G 15/42* (2013.01); *B65G 21/2054* (2013.01); *B65G 2201/0217* (2013.01); *B65G 2203/0241* (2013.01)

(58) Field of Classification Search
CPC ........ C03B 35/26; B65G 15/44; B65G 15/42; B65G 21/2054; B65G 2201/0217; B65G 2203/0241

USPC ............................... 198/373; 65/348; 414/24
See application file for complete search history.

(56) References Cited

U.S. PATENT DOCUMENTS

| 3,066,506 A | * | 12/1962 | Dichter | C03B 33/06 |
| | | | | 414/745.9 |
| 4,044,748 A | * | 8/1977 | Villanueva | B23D 59/02 |
| | | | | 198/339.1 |
| 4,279,346 A | * | 7/1981 | McClure | B07C 5/368 |
| | | | | 209/582 |
| 4,446,960 A | * | 5/1984 | Zauner | B65B 35/30 |
| | | | | 414/745.9 |

(Continued)

FOREIGN PATENT DOCUMENTS

| CN | 105438782 | * | 3/2016 | ............ B65G 47/26 |
| CN | 206318080 | * | 7/2017 | ............ B65B 23/20 |
| CN | 109108533 | * | 1/2019 | ............ B23K 37/00 |

*Primary Examiner* — James R Bidwell

(57) ABSTRACT

An intelligent device for conveying, grading and aligning of tube products includes: a conveying and grading mechanism, which includes: a timing belt, a timing belt power unit, a swing rod, a track, and a swing rod cylinder; wherein multiple baffles are evenly arranged on a surface of the timing belt; multiple track openings are evenly arranged on a surface of the track; the swing rod cylinder is fixed on a side wall of the track; the swing rod is fixed with an output end of the swing rod cylinder; and multiple single-bundle aligning assemblies, each includes: a cross beam, a vertical beam, a stacking unit, a bracket cylinder, a bracket, an aligning cylinder, and a swing bracket; wherein the bracket is fixed with a telescopic end of the bracket cylinder; the stacking unit is fixed on a surface of the vertical beam along a height direction thereof.

18 Claims, 9 Drawing Sheets

(56) References Cited

U.S. PATENT DOCUMENTS

| | | | | |
|---|---|---|---|---|
| 6,079,543 A | * | 6/2000 | Palmaer | B65G 17/08 |
| | | | | 198/445 |
| 2017/0369194 A1 | * | 12/2017 | Kittanakere Naagaraj | |
| | | | | A61J 3/00 |
| 2022/0396435 A1 | * | 12/2022 | Hill | B65G 23/28 |

* cited by examiner

INTELLIGENT DEVICE FOR CONVEYING, GRADING AND ALIGNING OF TUBE PRODUCTS

CROSS REFERENCE OF RELATED APPLICATION

The present invention claims priority under 35 U.S.C. 119(a-d) to CN 202210788220.X, filed Jul. 4, 2022.

BACKGROUND OF THE PRESENT INVENTION

Field of Invention

The present invention relates to a technical field of tube products production lines, and more particularly to an intelligent device for conveying, grading and aligning tube products.

Description of Related Arts

With the technological progress of glass tube production equipment, the quality of glass tubes is also increasing, as well as the proportion of high-grade products, usually reaching about 80%-85%. Due to the low proportion of medium- and low-quality products, the glass tubes produced by most manufacturers have not yet been graded at this stage, so that each bundle of glass tubes may contain products from different grades. Although the proportion is extremely low, even just one in a bundle, it will lower the price of that bundle of glass tubes, which means the company will lose part of its profits.

In addition to the grading of glass tubes, the aligning of glass tubes is also an urgent problem for enterprises to solve. Glass tubes are produced in a single piece, and the single glass tube produced will be conveyed to the corresponding outlet through a conveyor belt, and then stacked into a bundle for packaging. During the stacking process, there will be problems such as overlapping of glass tubes and unaligned end faces. Conventionally, the glass tubes needs are aligned manually, which will affect the speed of the entire production line and reduce production efficiency.

Therefore, it is urgent for those skilled in the art to develop an intelligent device with a high processing efficiency and abilities of conveying, grading and aligning of tube products.

SUMMARY OF THE PRESENT INVENTION

An object of the present invention is to provide an intelligent device with a high processing efficiency and abilities of conveying, grading and aligning of tube products.

Accordingly, in order to accomplish the above objects, the present invention provides:

an intelligent device for conveying, grading and aligning of tube products, comprising:

a conveying and grading mechanism, which comprises: a timing belt, a timing belt power unit, a swing rod, a track, and a swing rod cylinder; wherein the timing belt is placed above the track, and multiple baffles are evenly arranged on a surface of the timing belt; the timing belt power unit is connected to a driving wheel of the timing belt; multiple track openings are evenly arranged on a surface of the track; the swing rod cylinder is fixed on a side wall of the track and is close to a corresponding track opening; the swing rod is fixed with an output end of the swing rod cylinder, and the swing rod spans the corresponding track opening; and multiple single-bundle aligning assemblies arranged side by side, wherein the single-bundle aligning assemblies are correspondingly placed below the track openings; the single-bundle aligning assemblies are fixed together through a connecting beam, and the connecting beam is connected to the timing belt; each of the single-bundle aligning assemblies comprises: a cross beam, a vertical beam, a stacking unit, a bracket cylinder, a bracket, an aligning cylinder, and a swing bracket; wherein multiple track links are evenly fixed at a bottom of the track; a track fixing frame is fixed between corresponding vertical beams; both ends of the track links are fixed with the track fixing frame; both ends of the cross beam are fixed with corresponding vertical beams; the bracket cylinder and the aligning cylinder are fixed at both ends of the cross beam and are symmetrically distributed; the aligning cylinder is placed under the bracket cylinder; the bracket is fixed with a telescopic end of the bracket cylinder; the stacking unit is fixed on a surface of the vertical beam along a height direction thereof; the swing bracket is connected to the stacking unit, and the stacking unit drives the swing bracket to move up and down; the cross beam is fixed with the connecting beam, and is perpendicular to the track.

With the foregoing structure, the timing belt of the present invention drives the baffles to revolve, so as to move the glass tubes along the track. When the glass tube approaches the corresponding track opening, the swing rod cylinder drives the swing rod to rotate, so that the glass tube falls from the track opening and is caught by the bracket. When there is a layer of the glass tubes on the bracket, the bracket cylinder is activated to move the bracket, so that the glass tubes on the bracket falls onto the swing bracket, wherein end faces of the glass tubes on the swing bracket are aligned by the aligning cylinder, and then the stacking unit drives the swing bracket to move down. After being stacked into a bundle, the glass tubes on the swing bracket are placed on a conveyor production line for subsequent processing. According to the present invention, conveying and grading of the glass tubes can be realized by the conveying and grading mechanism, and the glass tubes are aligned by the single-bundle aligning assemblies, which can improve the production efficiency and avoid incorrect grading and unaligned end faces of the glass tubes.

Preferably, a sensor bracket is arranged on a side of the track and is close to the corresponding track opening; a counting sensor is fixed on a surface of the sensor bracket; an arc slope is arranged at the corresponding track opening for glass tubes to fall through. The counting sensor can sum the glass tubes falling onto the bracket, in such a manner that the glass tubes on the bracket, after reaching a certain number, are dropped onto the swing bracket. The arc slope at the track opening can buffer the falling glass tubes.

Preferably, a timing belt fixing plate is fixed in a middle of the timing belt, and both ends of the timing belt fixing plate are fixed with the driving wheel and a driven wheel of the timing belt; the timing belt fixing plate is fixed with the connecting beam. The timing belt fixing plate facilitates the connection of the conveying and grading mechanism with the single-bundle aligning assemblies.

Preferably, a mounting plate is fixed on a surface of the connecting beam, and an oblong hole is opened on a surface of the mounting plate; the mounting plate is fixed with the timing belt fixing plate; an included angle between the track and a horizontal plane along a moving direction of the glass tubes is 3-5°; U-shaped connecting pieces are fixed at joints between the bottom of the track and the track links, and the track links are constricted by the U-shaped connecting pieces. With the inclined track, the glass tube can press against the baffle during movement, thereby ensuring a smooth conveying process. Furthermore, the baffle can also control the moving speed of the glass tubes.

Preferably, the stacking unit is symmetrically arranged on both sides of the vertical beam, and the swing bracket is connected to the stacking unit through a swing link; an end of the swing link, which is close to the swing bracket, is fixed with a swing cylinder; the swing cylinder is placed at a bottom of the swing bracket, and an output end of the swing cylinder is fixed with the swing bracket to rotate the swing bracket. There are two stacking parts, which can be moved alternatively to improve work efficiency.

Preferably, a cylinder bracket is connected to a side at an end of the cross beam; both the bracket cylinder and the aligning cylinder are fixed with the cylinder bracket; the cylinder bracket is L-shaped; an end of the cylinder bracket is connected to a first width baffle which is arranged in a vertical direction; an aligning plate is fixed with a telescopic end of the aligning cylinder. The end faces of the glass tubes can be accurately aligned by the aligning plate. The first width baffle can block the sides of the glass tubes to prevent falling.

Preferably, a width moving bracket is provided on a side of the cross beam which is opposite to the cylinder bracket, and the width moving bracket is L-shaped; an end of the width moving bracket is connected to a second width baffle which is arranged in the vertical direction. The second width baffle can block the sides of the glass tubes to prevent falling.

Preferably, a width adjustment frame is fixed to a top of the cylinder bracket, and multiple width adjustment rails are evenly arranged on a top of the width adjustment frame; a top of the width moving bracket is slidably connected to a corresponding width adjustment rail, and a width fixing frame is fixed to the top of the width moving bracket; a width adjustment cylinder is fixed with an end of the width adjustment frame, and a telescopic end of the width adjustment cylinder is fixed with the width fixing frame. The cylinder bracket is fixed, and the width adjustment cylinder adjusts the width fixing frame to move along the width adjustment rail, thereby moving the width moving bracket to adjust a distance between the width moving bracket and the cylinder bracket. As a result, a width for containing the glass tubes on the bracket is adjusted.

Preferably, length adjustment rails are arranged on tops of both ends of the cross beam along a length direction thereof; the width adjustment frame is placed above the cross beam, and a bottom of the width adjustment frame is slidably connected to the length adjustment rails; two of the width adjustment frames are connected by a length moving rod, and the length moving rod is placed in a middle of the width adjustment frame; an end of the length moving rod is fixed with a length adjustment cylinder, and a fixed end of the length adjustment cylinder is fixed with the cross beam. With the length adjusting cylinder, the length moving rod can adjust a distance between cylinder brackets, so as to fit the length of the glass tubes to be aligned.

Preferably, a surface of the length moving rod is provided with threads, and thread directions at two ends of the length moving rod are opposite; the two ends of the length moving rod are threadedly connected to the width adjustment frame, and the length moving rod is threadedly connected to the connecting beam. The length adjustment cylinder drives the length moving rod to rotate, so that the two width adjustment frames can be moved in opposite directions, thereby adjusting the distance between the cylinder brackets.

With the foregoing structure, compared with the prior art, the intelligent device of the present invention has the following beneficial effects:

(1) According to the present invention, the conveying and grading of the glass tubes are realized through the conveying and grading mechanism, which improves work efficiency and make the grading of the glass tubes more accurate.

(2) The single-bundle aligning assembly can perform aligning on glass tubes of the same type. The multiple single-bundle aligning assemblies correspond to the track openings perform aligning on various types of glass tubes at the same time. Furthermore, the single-bundle aligning assemblies can be adjusted in length and width directions, so as to fit glass tubes with different lengths and widths.

BRIEF DESCRIPTION OF THE DRAWINGS

In order to explain the embodiments of the present invention or the technical solutions in the prior art more clearly, the accompanying drawings that used to describe the embodiments or the prior art will be briefly introduced below. Obviously, the drawings are illustrate the embodiments of the present invention. For those of ordinary skill in the art, other drawings can also be obtained according to the provided drawings without creative efforts.

Figure 1:
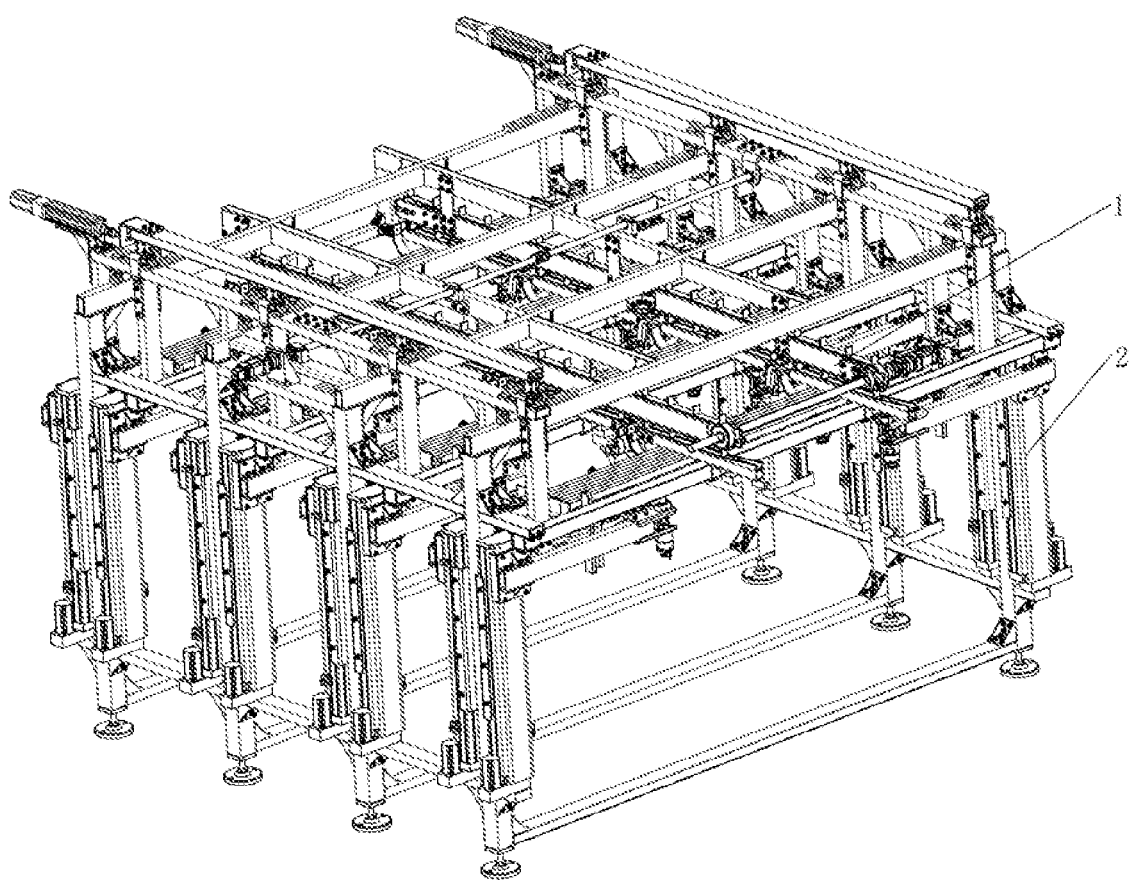
FIG. 1 is an overall structural view of an intelligent device provided by the present invention.
Figure 2:
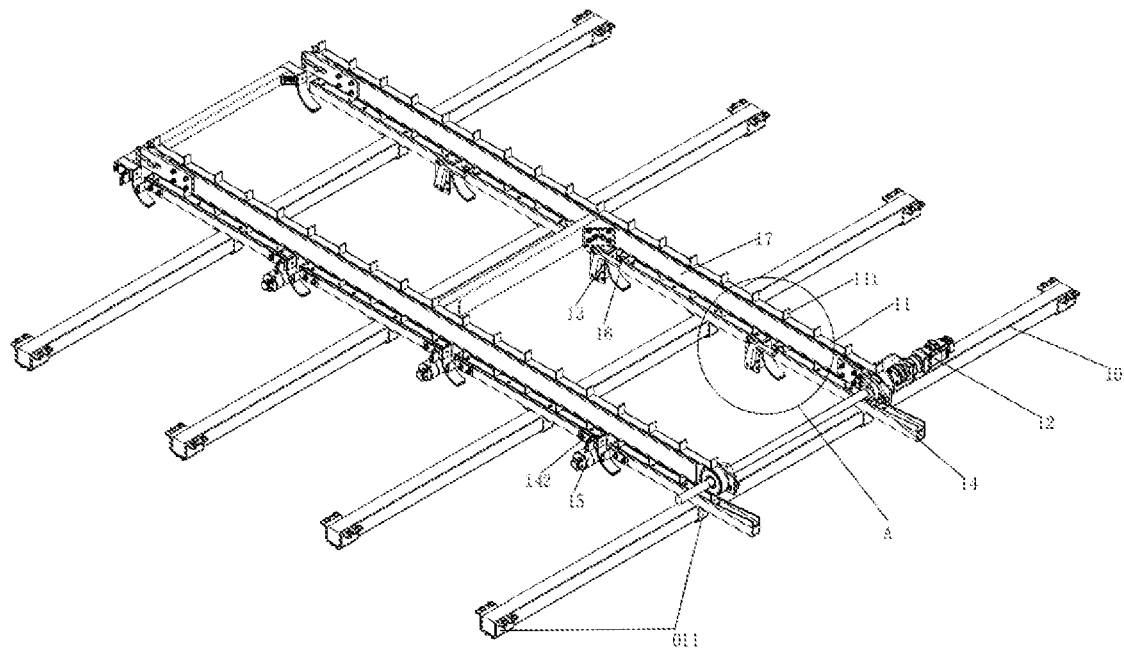
FIG. 2 is the structural view of a conveying and grading mechanism of the present invention.
Figure 3:
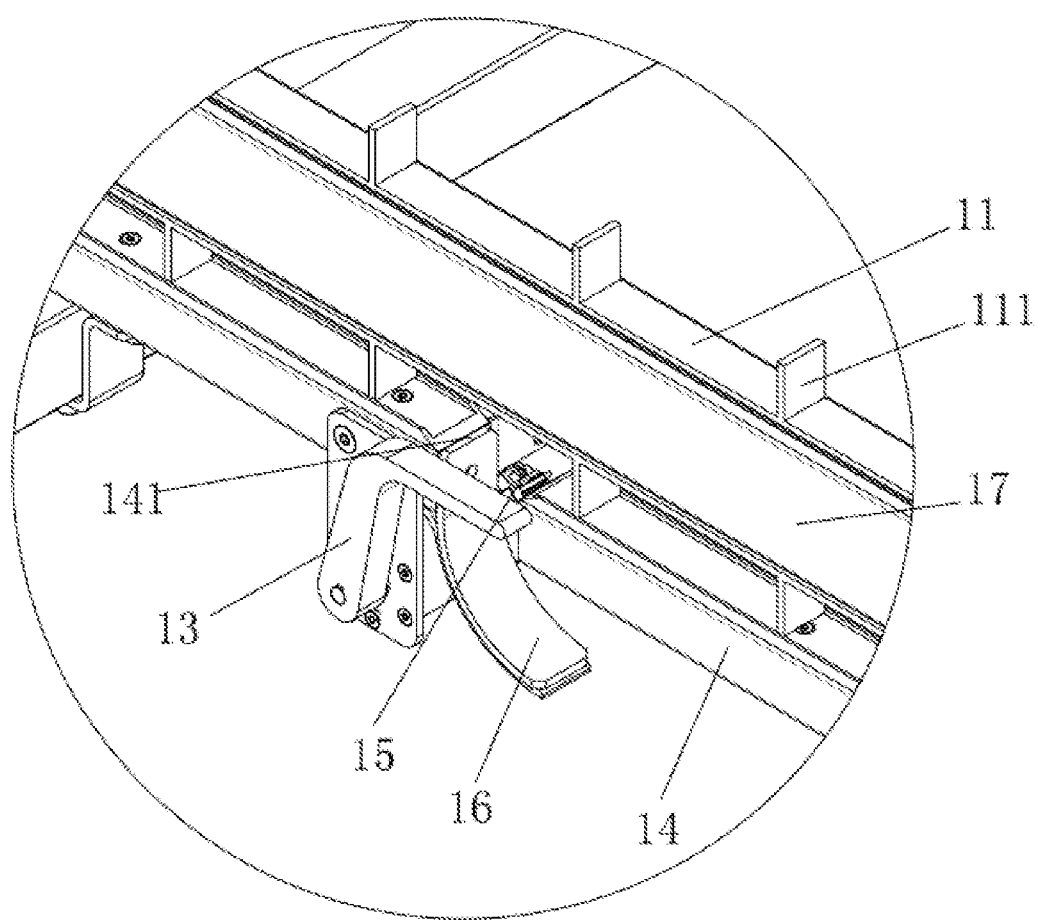
FIG. 3 is an enlarged view of part A in FIG. 2 of the present invention.
Figure 4:
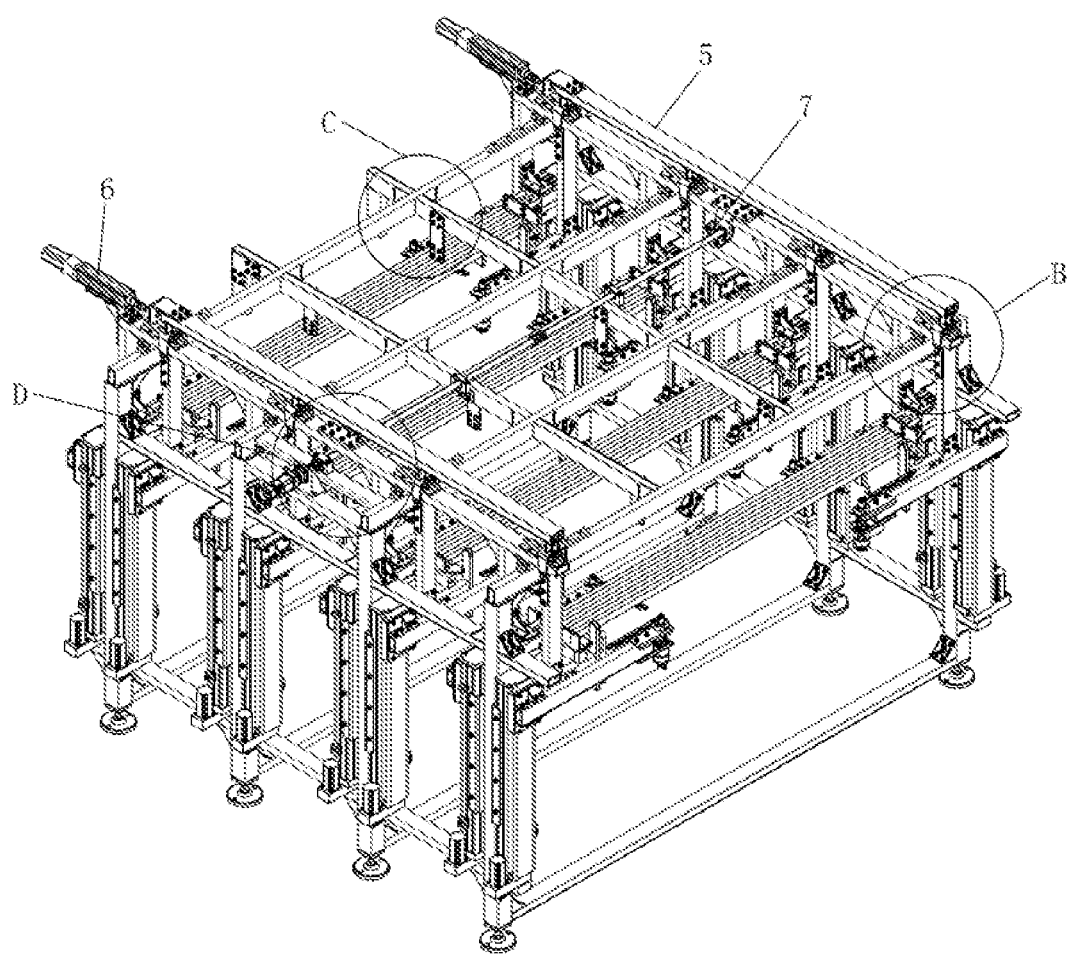
FIG. 4 is a structural view of a combination of multiple single-bundle aligning assemblies of the present invention.
Figure 5:
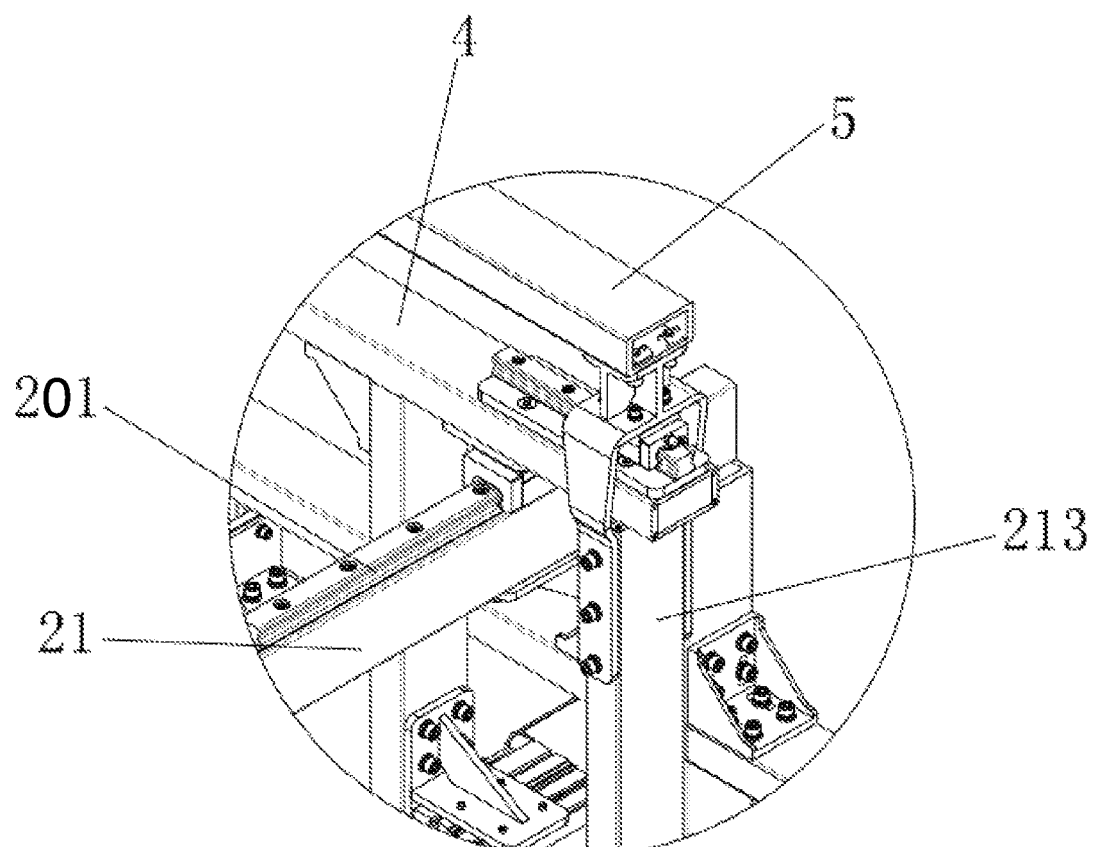
FIG. 5 is an enlarged view of part B in FIG. 4 of the present invention.
Figure 6:
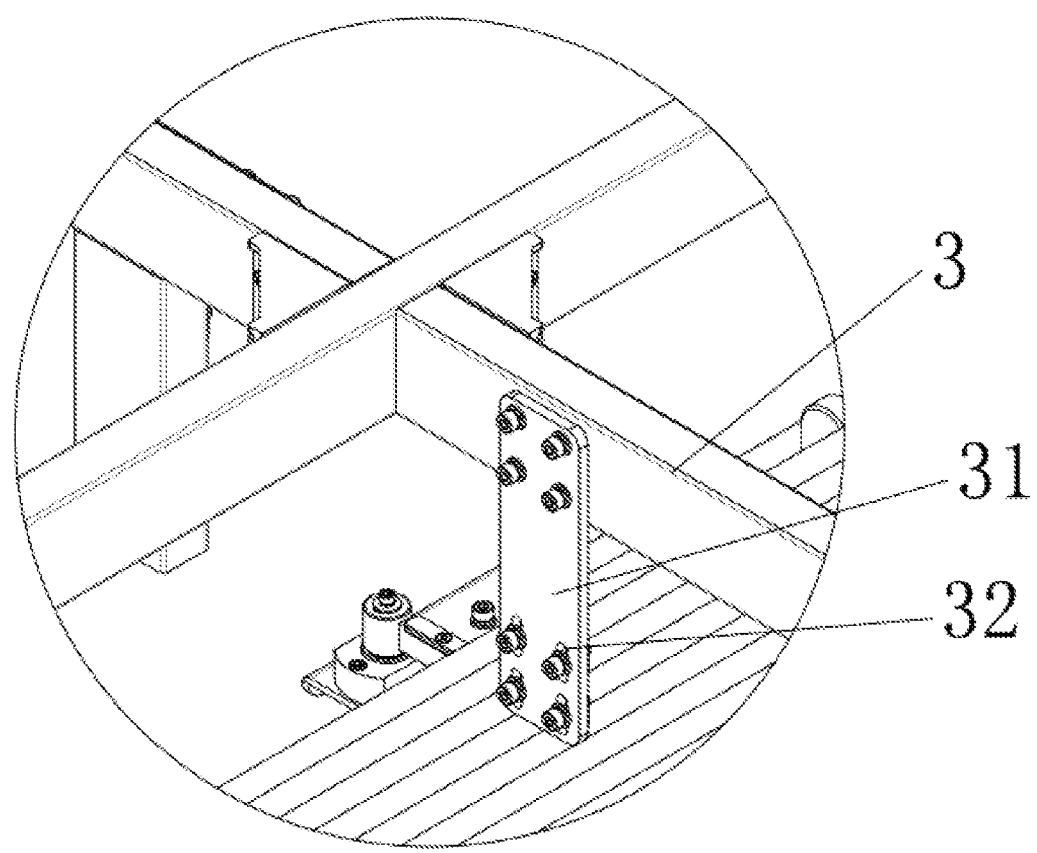
FIG. 6 is an enlarged view of part C in FIG. 4 of the present invention.
Figure 7:
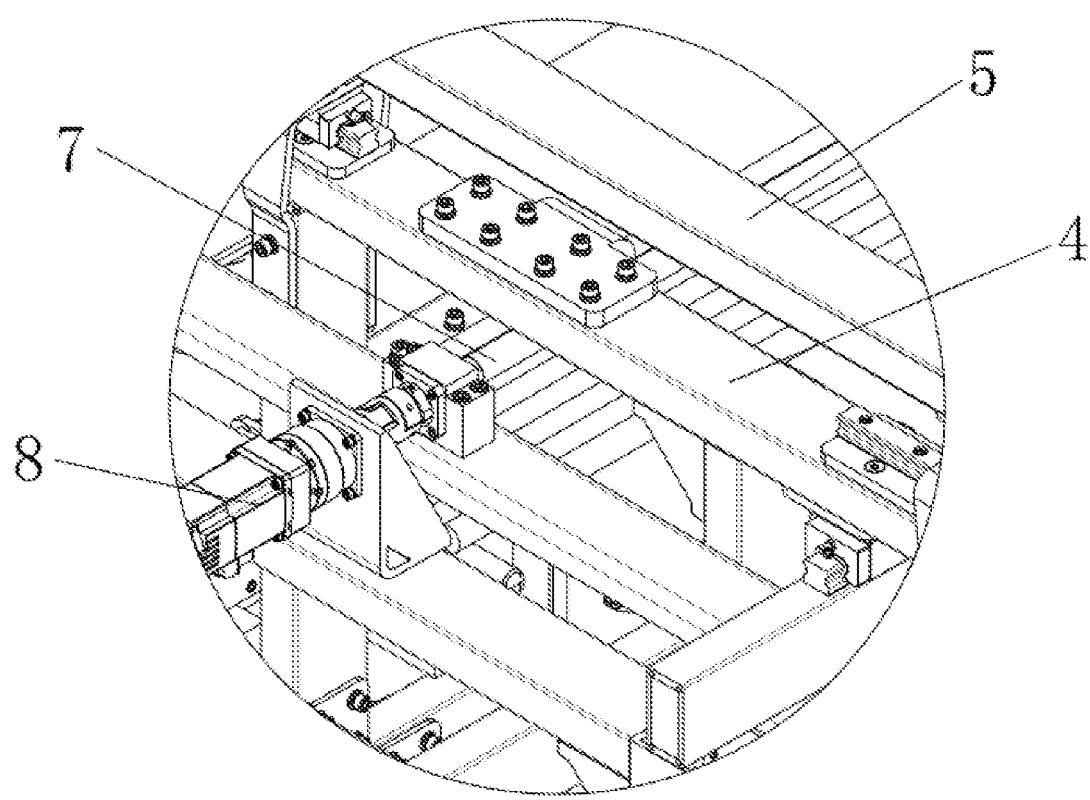
FIG. 7 is an enlarged view of part D in FIG. 4 of the present invention.
Figure 8:
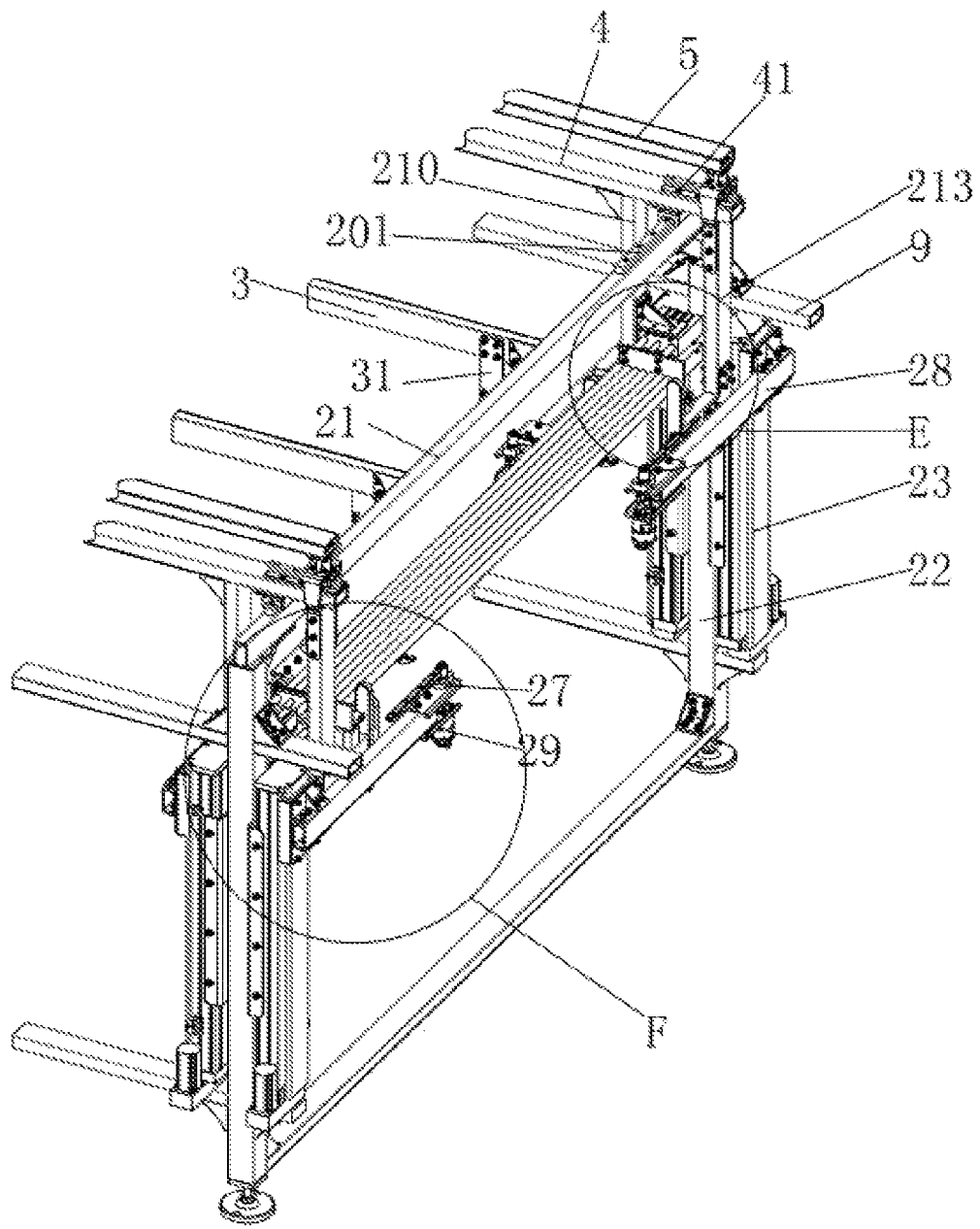
FIG. 8 is a structural view of one single-bundle aligning assembly of the present invention.
Figure 9:
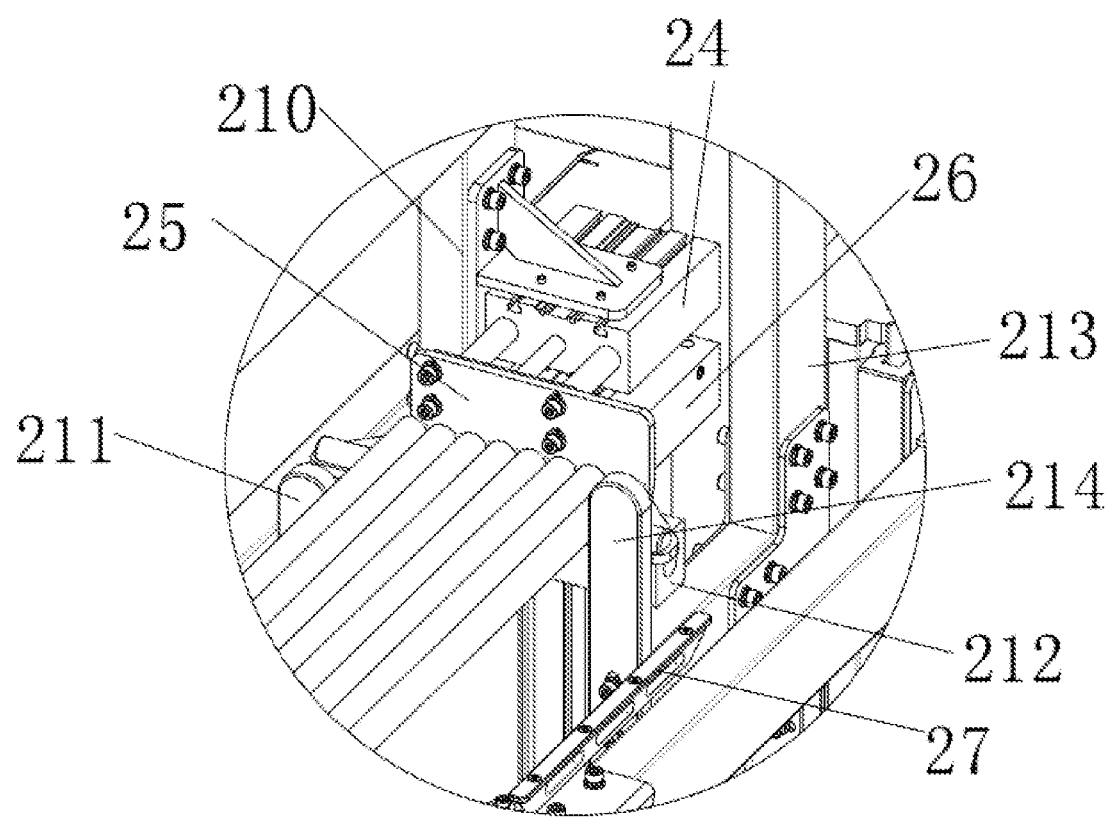
FIG. 9 is an enlarged view of part E in FIG. 8 of the present invention.
Figure 10:
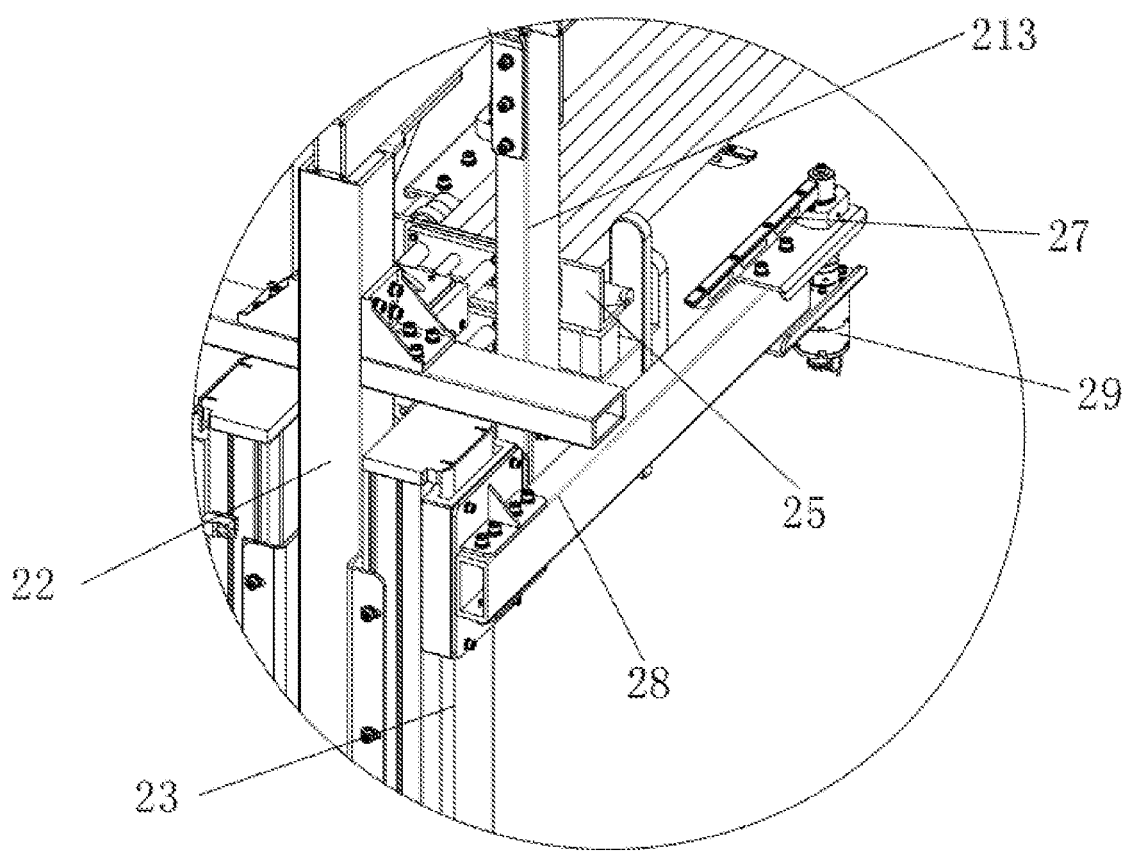
FIG. 10 is an enlarged view of part F in FIG. 9 of the present invention.

ELEMENT REFERENCE 1-conveying and grading mechanism;
11-timing belt;
111-baffle;
12-timing belt power unit; 13-swing rod;
14-track;
141-track opening; 142-sensor bracket;
15-swing rod cylinder; 16-arc slope; 17-timing belt fixing plate;
2-single-bundle aligning assembly;
21-cross beam;
201-length adjustment rail;
22-vertical beam; 23-stacking unit; 24-bracket cylinder; 25-bracket; 26-aligning cylinder; 27-swing bracket; 28-swing link; 29-swing cylinder; 210-cylinder bracket; 211-first width baffle; 212-aligning plate; 213-width moving bracket; 214-second width baffle;
3-connecting beam;

31-mounting plate; 32-oblong hole;
4-width adjustment frame;
41-width adjustment rail;
5-width fixing frame; 6-width adjustment cylinder; 7-length moving rod; 8-length adjustment cylinder; 9-track fixing frame; 10-track link; 011-U-shaped connecting piece.

DETAILED DESCRIPTION OF THE PREFERRED EMBODIMENT

The technical solutions in the embodiments of the present invention will be clearly and completely described below with reference to the accompanying drawings. Obviously, the described embodiments are only a part of all the embodiments of the present invention, rather than all the embodiments. Based on the embodiments given below, all other embodiments obtained by those of ordinary skill in the art without creative efforts shall fall within the protection scope of the present invention.

Embodiment 1

The present invention provides an intelligent device for conveying, grading and aligning of tube products, comprising:
a conveying and grading mechanism 1, which comprises: a timing belt 11, a timing belt power unit 12, a swing rod 13, a track 14, and a swing rod cylinder 15; wherein the timing belt 11 is placed above the track 14, and multiple baffles 111 are evenly arranged on a surface of the timing belt 11; the timing belt power unit 12 is connected to a driving wheel of the timing belt 11; multiple track openings 141 are evenly arranged on a surface of the track 14; the swing rod cylinder 15 is fixed on a side wall of the track 14 and is close to a corresponding track opening 141; the swing rod 13 is fixed with an output end of the swing rod cylinder 15, and the swing rod 13 spans the corresponding track opening 141; and
multiple single-bundle aligning assemblies 2 arranged side by side, wherein the single-bundle aligning assemblies 2 are correspondingly placed below the track openings 141; the single-bundle aligning assemblies 2 are fixed together through a connecting beam 3, and the connecting beam 3 is fixed with the track 14; each of the single-bundle aligning assemblies 2 comprises: a cross beam 21, a vertical beam 22, a stacking unit 23, a bracket cylinder 24, a bracket 25, an aligning cylinder 26, and a swing bracket 27; wherein multiple track links 10 are evenly fixed at a bottom of the track 14; a track fixing frame 9 is fixed between corresponding vertical beams 22; both ends of the track links 10 are fixed with the track fixing frame 9; both ends of the cross beam 21 are fixed with corresponding vertical beams 22; the bracket cylinder 24 and the aligning cylinder 26 are fixed at both ends of the cross beam 21 and are symmetrically distributed; the aligning cylinder 26 is placed under the bracket cylinder 24; the bracket 25 is fixed with a telescopic end of the bracket cylinder 24; the stacking unit 23 is fixed on a surface of the vertical beam 22 along a height direction thereof; the swing bracket 27 is connected to the stacking unit 23, and the stacking unit 23 drives the swing bracket 27 to move up and down; the cross beam 21 is fixed with the connecting beam 3, and is perpendicular to the track 14. The number of the track openings 141 is the same as that of the single-bundle aligning assemblies 2; a top of the swing bar 13 is aligned with a top of the track 14; there may be neither the swing bar 13 nor the swing rod cylinder 15 provided on the track opening 141 at the end of the track 14, so that the glass tube at the end of the track 14 can fall directly from the track opening 141 without affecting the movement of other glass tubes. Before the glass tube enters the track 14, the quality of each glass tube has been identified by visual inspection technology in the previous process, and related information is transmitted to a control center which activates the corresponding swing rod cylinder 15 according to a real-time position of the glass tube, so as to rotate the swing rod 13 and let the glass tube fall into the corresponding track opening 141.

Preferably, the timing belt power unit 12 may be a motor, as long as it can rotate the driving wheel of the timing belt 11.

Preferably, the swing rod cylinder 15 and the swing cylinder 29 can be replaced by a motor, a magnetic device, or the like.

Preferably, the bracket cylinder 24 can be provided at one end of the cross beam instead of both ends, and the other end of the cross beam can be fixed, as long as end face uniformity of a layer of the glass tubes is controlled within a reasonable range, thereby cutting costs.

Preferably, adjustment feet are provided at a bottom of the vertical beam 22, so as to eliminate deviation caused by assembly or uneven ground.

Preferably, a sensor bracket 142 is arranged on a side of the track 14 and is close to the corresponding track opening 141; a counting sensor is fixed on a surface of the sensor bracket 142; an arc slope 16 is arranged at the corresponding track opening 141 for glass tubes to fall through. The counting sensor can sum the glass tubes that fall through the track opening 141, so as to judge whether the bracket 25 is fully loaded with the glass tubes. Then the control center controls the bracket cylinder 24 to move away from the glass tubes, so that the glass tubes fall onto the swing bracket 27.

Preferably, a timing belt fixing plate 17 is fixed in a middle of the timing belt 11, and both ends of the timing belt fixing plate 17 are fixed with the driving wheel and a driven wheel of the timing belt 11; the timing belt fixing plate 17 is fixed with the connecting beam 3.

Preferably, a mounting plate 31 is fixed on a surface of the connecting beam 3, and an oblong hole 32 is opened on a surface of the mounting plate 31; the mounting plate 31 is fixed with the timing belt fixing plate 17; an included angle between the track 14 and a horizontal plane along a moving direction of the glass tubes is 3-5°; U-shaped connecting pieces 011 are fixed at joints between the bottom of the track 14 and the track links 10, and the track links 10 are constricted by the U-shaped connecting pieces 011. Two ends of the U-shaped connecting piece 011 are connected to the bottom of the track 14 by bolts, and a distance between the end of the U-shaped connecting piece 011 and the bottom of the track 14 can also be adjusted by the bolts, thereby adjusting the angle of the track 14. After the track links 10 are constricted by the U-shaped connecting pieces 011, a bottom of the track link 10 is fixed with a bottom of the U-shaped connecting piece 011 by bolts, thereby further stabilizing a connection structure. The mounting plate 31 and the timing belt fixing plate 17 are connected by bolts, and the bolt is inserted into the oblong hole 32. By adjusting a fixing position of the oblong hole 23 on each mounting plate 31 and the bolts, inclination of the timing belt fixing plate 17 can be adjusted, so as to adjust inclination of the timing belt 11 for matching the angle of the track 14 and accurate conveying of the glass tubes.

Preferably, the stacking unit 23 is symmetrically arranged on both sides of the vertical beam 22, and the swing bracket 27 is connected to the stacking unit 23 through a swing link 28; an end of the swing link 28, which is close to the swing bracket 27, is fixed with a swing cylinder 29; the swing cylinder 29 is placed at a bottom of the swing bracket 27, and an output end of the swing cylinder 29 is fixed with the swing bracket 27 to rotate the swing bracket 27. Two stacking units 23 correspond to two swing brackets 27. When a surface of the bracket 25 continuously receives the glass tube, one swing bracket 27 is unfolded to be perpendicular to the glass tube, and the other is folded to be parallel to the glass tube. When the bracket is fully loaded, the glass tubes thereon will fall onto the swing bracket 27 that is perpendicular to the glass tube. When the glass tubes on the swing bracket 27 forms a bundle, the stacking unit 23 drives the swing bracket 27 to move down for the next process. At this time, the other swing bracket 27 is unfolded for receiving the glass tubes. The two stacking units 23 work alternately, which improves the work efficiency. When the swing bracket 27 is not in work, it is folded to avoid affecting glass tube conveying of the other swing bracket 27.

Preferably, the stacking unit 23 is provided with a sliding rail, and a slider is provided at a joint of the swing link 28 and the stacking unit 23, wherein the stacking unit 23 drives the swing link 28 to move up and down along the sliding rail.

Preferably, a cylinder bracket 210 is connected to a side at an end of the cross beam 21; both the bracket cylinder 24 and the aligning cylinder 26 are fixed with the cylinder bracket 210; the cylinder bracket 210 is L-shaped; an end of the cylinder bracket 210 is connected to a first width baffle 211 which is arranged in a vertical direction; an aligning plate 212 is fixed with a telescopic end of the aligning cylinder 26.

Preferably, a width moving bracket 213 is provided on a side of the cross beam 21 which is opposite to the cylinder bracket 210, and the width moving bracket 213 is L-shaped; an end of the width moving bracket 213 is connected to a second width baffle 214 which is arranged in the vertical direction. The first width baffle 211 and the second width baffle 214 can limit the sides of a layer of the glass tubes.

Preferably, a width adjustment frame 4 is fixed to a top of the cylinder bracket 210, and multiple width adjustment rails 41 are evenly arranged on a top of the width adjustment frame 4; a top of the width moving bracket 213 is slidably connected to a corresponding width adjustment rail 41, and a width fixing frame 5 is fixed to the top of the width moving bracket 213; a width adjustment cylinder 6 is fixed with an end of the width adjustment frame 4, and a telescopic end of the width adjustment cylinder 6 is fixed with the width fixing frame 5.

Preferably, length adjustment rails 211 are arranged on tops of both ends of the cross beam 21 along a length direction thereof; the width adjustment frame 4 is placed above the cross beam 21, and a bottom of the width adjustment frame 4 is slidably connected to the length adjustment rails 211; two of the width adjustment frames 4 are connected by a length moving rod 7, and the length moving rod 7 is placed in a middle of the width adjustment frame 4; an end of the length moving rod 7 is fixed with a length adjustment cylinder 8, and a fixed end of the length adjustment cylinder 8 is fixed with the cross beam 21.

Preferably, a surface of the length moving rod 7 is provided with threads, and thread directions at two ends of the length moving rod 7 are opposite; the two ends of the length moving rod 7 are threadedly connected to the width adjustment frame 4, and the length moving rod 7 is threadedly connected to the connecting beam 3.

Embodiment 2

One end of the length moving rod 7 is fixed with the width adjustment frame 4, and the other end is fixed with the length adjustment cylinder 8. The length adjustment cylinder 8 drives the length moving rod 7 to move, so as to move the width adjustment frame 4 at one end, which adjusts a distance between the two width adjustment frames 4.

Other technical schemes in the embodiment 2 are the same as those in the embodiment 1, and will not be repeated here.

Working principle:

The glass tube is driven by the baffle 111 on the timing belt 11 to move along the track 14. When the glass tube is moved to the corresponding track opening 141, the swing rod cylinder 15 at the corresponding position drives the swing rod 13 to rotate, so that the glass tube can fall from the track opening 141 and reach the top of the bracket 25. When the glass tubes fulfill a layer on the top of the bracket 25, the bracket 25 is driven by the bracket cylinder 24 to move away from the glass tubes, and the glass tubes fall to the top of the swing bracket 27 in which the ends the glass tubes are aligned by the aligning cylinder 26. Then the stacking units 23 lowers the swing bracket 27 by a certain distance to wait for the arrival of the next layer of the glass tubes. When the glass tubes on the swing bracket 27 are stacked into a bundle, the stacking unit 23 lowers the swing bracket 27 to put the bundle of the glass tubes on a packaging and conveying platform. Then the swing bracket 27 swings to a position parallel to the glass tubes, and returns to an initial position until there are more glass tubes to be received. When the swing bracket 27 moves down with a bundle of glass tubes, another swing bracket 27 swings to a vertical position of the glass tubes for receiving subsequent glass tubes.

The embodiments above are described in a progressive manner, and each embodiment focuses on the differences from the other embodiment. The same and similar parts between the embodiments can be referred to each other.

The above description of the embodiments enables any person skilled in the art to realize or use the present invention. Various modifications to these embodiments will be obvious to those skilled in the art. Generic principles defined herein may be implemented into other embodiments without departing from the spirit or scope of the present invention. Thus, the present invention is not intended to be limited by the embodiments above, but claims the widest scope consistent with the principles and novel features disclosed.

What is claimed is:

1. An intelligent device for conveying, grading and aligning of tube products, comprising:
a conveying and grading mechanism (1), which comprises: a timing belt (11), a timing belt power unit (12), a swing rod (13), a track (14), and a swing rod cylinder (15); wherein the timing belt (11) is placed above the track (14), and multiple baffles (111) are evenly arranged on a surface of the timing belt (11); the timing belt power unit (12) is connected to a driving wheel of the timing belt (11); multiple track openings (141) are evenly arranged on a surface of the track (14); the swing rod cylinder (15) is fixed on a side wall of the track (14) and is close to a corresponding track opening (141); the swing rod (13) is fixed with an output end of the swing rod cylinder (15), and the swing rod (13) spans the corresponding track opening (141); and
multiple single-bundle aligning assemblies (2) arranged side by side, wherein the single-bundle aligning assemblies (2) are correspondingly placed below the track openings (141); the single-bundle aligning assemblies (2) are fixed together through a connecting beam (3), and the connecting beam (3) is connected to the timing belt (11); each of the single-bundle aligning assemblies (2) comprises: a cross beam (21), a vertical beam (22), a stacking unit (23), a bracket cylinder (24), a bracket (25), an aligning cylinder (26), and a swing bracket (27); wherein multiple track links (10) are evenly fixed at a bottom of the track (14); a track fixing frame (9) is fixed between corresponding vertical beams (22); both ends of the track links (10) are fixed with the track fixing frame (9); both ends of the cross beam (21) are fixed with corresponding vertical beams (22); the bracket cylinder (24) and the aligning cylinder (26) are fixed at both ends of the cross beam (21) and are symmetrically distributed; the aligning cylinder (26) is placed under the bracket cylinder (24); the bracket (25) is fixed with a telescopic end of the bracket cylinder (24); the stacking unit (23) is fixed on a surface of the vertical beam (22) along a height direction thereof; the swing bracket (27) is connected to the stacking unit (23), and the stacking unit (23) drives the swing bracket (27) to move up and down; the cross beam (21) is fixed with the connecting beam (3), and is perpendicular to the track (14).

2. The intelligent device, as recited in claim 1, wherein a sensor bracket (142) is arranged on a side of the track (14) and is close to the corresponding track opening (141); a counting sensor is fixed on a surface of the sensor bracket (142); an arc slope (16) is arranged at the corresponding track opening (141) for glass tubes to fall through.

3. The intelligent device, as recited in claim 1, wherein a timing belt fixing plate (17) is fixed in a middle of the timing belt (11), and both ends of the timing belt fixing plate (17) are fixed with the driving wheel and a driven wheel of the timing belt (11); the timing belt fixing plate (17) is fixed with the connecting beam (3).

4. The intelligent device, as recited in claim 2, wherein a timing belt fixing plate (17) is fixed in a middle of the timing belt (11), and both ends of the timing belt fixing plate (17) are fixed with the driving wheel and a driven wheel of the timing belt (11); the timing belt fixing plate (17) is fixed with the connecting beam (3).

5. The intelligent device, as recited in claim 3, wherein a mounting plate (31) is fixed on a surface of the connecting beam (3), and an oblong hole (32) is opened on a surface of the mounting plate (31); the mounting plate (31) is fixed with the timing belt fixing plate (17); an included angle between the track (14) and a horizontal plane along a moving direction of the glass tubes is 3-5°; U-shaped connecting pieces (011) are fixed at joints between the bottom of the track (14) and the track links (10), and the track links (10) are constricted by the U-shaped connecting pieces (011).

6. The intelligent device, as recited in claim 4, wherein a mounting plate (31) is fixed on a surface of the connecting beam (3), and an oblong hole (32) is opened on a surface of the mounting plate (31); the mounting plate (31) is fixed with the timing belt fixing plate (17); an included angle between the track (14) and a horizontal plane along a moving direction of the glass tubes is 3-5°; U-shaped connecting pieces (011) are fixed at joints between the bottom of the track (14) and the track links (10), and the track links (10) are constricted by the U-shaped connecting pieces (011).

7. The intelligent device, as recited in claim 5, wherein the stacking unit (23) is symmetrically arranged on both sides of the vertical beam (22), and the swing bracket (27) is connected to the stacking unit (23) through a swing link (28); an end of the swing link (28), which is close to the swing bracket (27), is fixed with a swing cylinder (29); the swing cylinder (29) is placed at a bottom of the swing bracket (27), and an output end of the swing cylinder (29) is fixed with the swing bracket (27) to rotate the swing bracket (27).

8. The intelligent device, as recited in claim 6, wherein the stacking unit (23) is symmetrically arranged on both sides of the vertical beam (22), and the swing bracket (27) is connected to the stacking unit (23) through a swing link (28); an end of the swing link (28), which is close to the swing bracket (27), is fixed with a swing cylinder (29); the swing cylinder (29) is placed at a bottom of the swing bracket (27), and an output end of the swing cylinder (29) is fixed with the swing bracket (27) to rotate the swing bracket (27).

9. The intelligent device, as recited in claim 7, wherein a cylinder bracket (210) is connected to a side at an end of the cross beam (21); both the bracket cylinder (24) and the aligning cylinder (26) are fixed with the cylinder bracket (210); the cylinder bracket (210) is L-shaped; an end of the cylinder bracket (210) is connected to a first width baffle (211) which is arranged in a vertical direction; an aligning plate (212) is fixed with a telescopic end of the aligning cylinder (26).

10. The intelligent device, as recited in claim 8, wherein a cylinder bracket (210) is connected to a side at an end of the cross beam (21); both the bracket cylinder (24) and the aligning cylinder (26) are fixed with the cylinder bracket (210); the cylinder bracket (210) is L-shaped; an end of the cylinder bracket (210) is connected to a first width baffle (211) which is arranged in a vertical direction; an aligning plate (212) is fixed with a telescopic end of the aligning cylinder (26).

11. The intelligent device, as recited in claim 9, wherein a width moving bracket (213) is provided on a side of the cross beam (21) which is opposite to the cylinder bracket (210), and the width moving bracket (213) is L-shaped; an end of the width moving bracket (213) is connected to a second width baffle (214) which is arranged in the vertical direction.

12. The intelligent device, as recited in claim 10, wherein a width moving bracket (213) is provided on a side of the cross beam (21) which is opposite to the cylinder bracket (210), and the width moving bracket (213) is L-shaped; an end of the width moving bracket (213) is connected to a second width baffle (214) which is arranged in the vertical direction.

13. The intelligent device, as recited in claim 11, wherein a width adjustment frame (4) is fixed to a top of the cylinder bracket (210), and multiple width adjustment rails (41) are evenly arranged on a top of the width adjustment frame (4); a top of the width moving bracket (213) is slidably connected to a corresponding width adjustment rail (41), and a width fixing frame (5) is fixed to the top of the width moving bracket (213); a width adjustment cylinder (6) is fixed with an end of the width adjustment frame (4), and a telescopic end of the width adjustment cylinder (6) is fixed with the width fixing frame (5).

14. The intelligent device, as recited in claim 12, wherein a width adjustment frame (4) is fixed to a top of the cylinder bracket (210), and multiple width adjustment rails (41) are evenly arranged on a top of the width adjustment frame (4); a top of the width moving bracket (213) is slidably connected to a corresponding width adjustment rail (41), and a width fixing frame (5) is fixed to the top of the width moving bracket (213); a width adjustment cylinder (6) is fixed with an end of the width adjustment frame (4), and a telescopic end of the width adjustment cylinder (6) is fixed with the width fixing frame (5).

15. The intelligent device, as recited in claim 13, wherein length adjustment rails (201) are arranged on tops of both ends of the cross beam (21) along a length direction thereof; the width adjustment frame (4) is placed above the cross beam (21), and a bottom of the width adjustment frame (4) is slidably connected to the length adjustment rails (201); two of the width adjustment frames (4) are connected by a length moving rod (7), and the length moving rod (7) is placed in a middle of the width adjustment frame (4); an end of the length moving rod (7) is fixed with a length adjustment cylinder (8), and a fixed end of the length adjustment cylinder (8) is fixed with the cross beam (21).

16. The intelligent device, as recited in claim 14, wherein length adjustment rails (201) are arranged on tops of both ends of the cross beam (21) along a length direction thereof; the width adjustment frame (4) is placed above the cross beam (21), and a bottom of the width adjustment frame (4) is slidably connected to the length adjustment rails (201); two of the width adjustment frames (4) are connected by a length moving rod (7), and the length moving rod (7) is placed in a middle of the width adjustment frame (4); an end of the length moving rod (7) is fixed with a length adjustment cylinder (8), and a fixed end of the length adjustment cylinder (8) is fixed with the cross beam (21).

17. The intelligent device, as recited in claim 15, wherein a surface of the length moving rod (7) is provided with threads, and thread directions at two ends of the length moving rod (7) are opposite; the two ends of the length moving rod (7) are threadedly connected to the width adjustment frame (4), and the length moving rod (7) is threadedly connected to the connecting beam (3).

18. The intelligent device, as recited in claim 16, wherein a surface of the length moving rod (7) is provided with threads, and thread directions at two ends of the length moving rod (7) are opposite; the two ends of the length moving rod (7) are threadedly connected to the width adjustment frame (4), and the length moving rod (7) is threadedly connected to the connecting beam (3).

\* \* \* \* \*